US008125310B2

(12) United States Patent
Enkerud et al.

(10) Patent No.: US 8,125,310 B2
(45) Date of Patent: Feb. 28, 2012

(54) METHOD AND SYSTEM FOR PROVIDING A USER INTERFACE

(75) Inventors: Torgeir Enkerud, Oslo (NO); Tone Grete Graven, Oslo (NO); Kristoffer Husøy, Oslo (NO)

(73) Assignee: ABB Research Ltd., Zürich (CH)

( * ) Notice: Subject to any disclaimer, the term of this patent is extended or adjusted under 35 U.S.C. 154(b) by 681 days.

(21) Appl. No.: 11/887,553

(22) PCT Filed: Mar. 30, 2006

(86) PCT No.: PCT/IB2006/000729
§ 371 (c)(1),
(2), (4) Date: Feb. 18, 2009

(87) PCT Pub. No.: WO2006/103541
PCT Pub. Date: Oct. 5, 2006

(65) Prior Publication Data
US 2009/0216341 A1    Aug. 27, 2009

Related U.S. Application Data

(60) Provisional application No. 60/667,080, filed on Apr. 1, 2005, provisional application No. 60/778,914, filed on Mar. 6, 2006.

(51) Int. Cl.
G05B 23/02    (2006.01)
G05B 11/01    (2006.01)
G05B 15/00    (2006.01)
G06F 3/00     (2006.01)

(52) U.S. Cl. ........... 340/3.71; 700/17; 700/83; 715/700; 345/594

(58) Field of Classification Search ............ 700/17, 700/83; 715/700; 340/3.71; 345/594
See application file for complete search history.

(56) References Cited

U.S. PATENT DOCUMENTS

| 5,576,946 | A  | * | 11/1996 | Bender et al. ............... 700/17 |
| 5,581,242 | A  | * | 12/1996 | Arita et al. ............... 340/691.6 |
| 5,838,974 | A  | * | 11/1998 | Ritscher et al. ............ 717/109 |
| 5,943,236 | A  | * | 8/1999  | Ohno et al. ................ 700/108 |
| 6,523,038 | B1 | * | 2/2003  | Iida et al. .................... 1/1 |
| 6,947,798 | B2 | * | 9/2005  | Bronikowski et al. ....... 700/90 |
| 7,092,771 | B2 | * | 8/2006  | Retlich et al. .............. 700/72 |

(Continued)

FOREIGN PATENT DOCUMENTS

| GB | 2272325 A        | 5/1994  |
| WO | WO-02/084596 A1  | 10/2002 |
| WO | WO-2005/109124 A1| 11/2005 |

OTHER PUBLICATIONS

PCT/ISA/210—International Search Report—Jun. 30, 2006.

(Continued)

Primary Examiner — Ramesh Patel
(74) Attorney, Agent, or Firm — Venable LLP; Eric J. Franklin

(57) ABSTRACT

A method for providing a user interface for an industrial control system. Information is presented at least in part displayed in layers or filters on one or more display screens of a control system. The control system may include other media for presenting or displaying information. The content for the one or more layers, which also provide an interface to a process state or function, is determined based on information available from the control system, dependent on which of the available items of the information shall be visually displayed or otherwise presented prominently, or displayed less prominently, or hidden. An interface, computer programs and a control system are also provided.

30 Claims, 9 Drawing Sheets

U.S. PATENT DOCUMENTS

| | | | |
|---|---|---|---|
| 7,187,389 B2 * | 3/2007 | Redpath et al. | 345/619 |
| 7,555,706 B2 * | 6/2009 | Chapman et al. | 715/234 |
| 7,652,567 B2 * | 1/2010 | Murayama et al. | 340/521 |
| 7,692,537 B2 * | 4/2010 | Skold et al. | 340/506 |
| 7,715,929 B2 * | 5/2010 | Skourup et al. | 700/17 |
| 2002/0149602 A1 * | 10/2002 | Redpath et al. | 345/629 |
| 2006/0190584 A1 * | 8/2006 | Skold et al. | 709/223 |
| 2006/0241793 A1 * | 10/2006 | Skourup et al. | 700/83 |
| 2006/0259154 A1 * | 11/2006 | Hood et al. | 700/2 |
| 2007/0276514 A1 * | 11/2007 | Martinez et al. | 700/80 |
| 2008/0066004 A1 * | 3/2008 | Blevins et al. | 715/771 |
| 2008/0189638 A1 * | 8/2008 | Mody et al. | 715/771 |
| 2009/0083525 A1 * | 3/2009 | Jarrett et al. | 712/226 |

OTHER PUBLICATIONS

PCT/IPEA/409—International Preliminary Report on Patentability—Dec. 12, 2006.

* cited by examiner

METHOD AND SYSTEM FOR PROVIDING A USER INTERFACE

CROSS-REFERENCE TO RELATED APPLICATIONS

This application claims priority to U.S. provisional patent application 60/667,080 filed 1 Apr. 2005 and U.S. provisional patent application 60/778,914 filed 6 Mar. 2006 and is the national phase under 35 U.S.C. §371 of PCT/IB2006/000729 filed 30 Mar. 2006.

TECHNICAL FIELD

The invention concerns method and system for providing an user interface of a industrial control system. The interface comprises in part information from the control system that is displayed in layers on one or more display screens of a control system.

TECHNICAL BACKGROUND

In the supervisory control of industrial plants there is significant need for information about equipment, current and historic process data, trends, etc. This information is typically provided by the control system and usually in the form of one or more distributed control systems (DCS) and/or supervisory control and data acquisition (SCADA) systems. With the increases in computing power and advances in communication and computerized measurement there is an increasing amount of data available for the operators.

The information is today often presented to the operators through display screens showing process graphics that presents process data (measurements, values), tag identifiers, equipment id, alarm status, connections between plant equipment, etc. As more and more data is being presented to the operators, the visual user interfaces often hold very much information. It can be difficult for the operator to determine what is important information and what is not. One reason for this cluttered look in the process graphics in some cases may not the actual amount of information presented, but rather poor design with for example an unnecessary prominence of static information presented with thick lines and strong colours, which make it difficult for an operator to use such displays as a technical tool for efficient search, retrieval and evaluation of information stored in one or more databases. The problem of finding the relevant technical information in a large information space is further complicated by the fact that in many situations the operator often has limited time available to make a decision. The significance of the information available will vary with the current situation. That is, users of industrial control systems have to deal at least in part with a context sensitivity problem, as in some context certain information will be essential and in others irrelevant.

WO02084596 entitled Simultaneous display of data and/or objects in layers on a display screen, describes a system and method for displaying objects in a plurality of layers on a visual display. The layers are distinguished from one another using a variety of display attributes in order to emphasize objects in upper layers and de-emphasize objects in lower layers. The user is able to change the layering in order to emphasize a different group, or category, of objects and de-emphasize other groups. The layers can be predefined, for example hardware and software layers, or may be defined by analyzing the attributes corresponding with the objects. Objects and their attributes are stored in a data store, such as a relational database. Predefined layers include one or more of these attributes to use for matching.

WO2005109124 entitled A process plant user interface system having customized process graphic display layers in an integrated environment, assigned to IBM, describes a method useful for providing a user interface for a process plant. It includes displaying graphical depictions of process plant elements of the process plant via the user interface. Information is generated for a plurality of content layers of a process graphic display of the process plant elements by processing data regarding operation of the process plant. Content to be displayed via the user interface is determined from the generated information by determining which content layer of the plurality of content layer is to be displayed. In some embodiments, the determination may be made based on a user profile characteristic. The generated information may therefore support multiple views of the process plant via the user interface for a plurality of different types of users of the user interface, and may involve processing data regarding actual and simulated operation of the process plant.

Some control systems also have a concept called layers or filters. These layers are used in the engineering of the system, to separate what information should be shown to which type of users when the system is being engineered. For example this can be used for hiding information that is only relevant to IT support personnel from process engineers or the operators.

SUMMARY OF THE INVENTION

According to one or more embodiments of the present invention an improvement is provided to a method for providing a user interface for an industrial control system wherein information is presented at least in part displayed in layers on one or more display screens of a control system, in which said control system a plurality of process graphics and other presentation schemes and/or devices provide said information held by said control system, wherein the content for said one or more layers providing an interface to a process state or function is determined based on said information available from said control system and by calculating which of the available items of said information shall be visually displayed or otherwise presented prominently, or displayed less prominently, or hidden.

According to another aspect of an embodiment of the invention improvements are provided in the form of a for providing a user interface for an industrial control system wherein information is presented at least in part displayed in layers on one or more display screens of a control system, the method further comprising the action of automatically loading representations of one or more items of said information dependent on a status of a process controlled by said control system, the status comprising and not limited to any from the group of: start, run, process change, event, alarm, stop, offline, configuration or maintenance, simulation.

According to another aspect of an embodiment of the invention improvements are provided in the form of a method for providing a user interface for an industrial control system wherein information is presented at least in part displayed in layers on one or more display screens of a control system, the method further comprising the action of automatically loading representations of one or more items of said information dependent on a task for an operator, the task comprising and not limited to any from the group of: start up, operate, change operation, alarm handling tasks, specific process related tasks, maintenance, shut down.

According to another aspect of an embodiment of the invention improvements are provided in the form of a method for providing a user interface for an industrial control system wherein information is presented at least in part displayed in layers on one or more display screens of a control system, the method further comprising the action of automatically loading representations of one or more items of said information and displaying a first layer when loaded completely and before one or more other said layers have loaded.

According to another aspect of an embodiment of the invention improvements are provided in the form of a method for providing a user interface for an industrial control system wherein information is presented at least in part displayed in layers on one or more display screens of a control system, the method further comprising the action of automatically loading representations of one or more items of said information and displaying or otherwise presenting each layer when completely loaded according to a load order for a plurality of the one or more said layers.

According to another aspect of an embodiment of the invention improvements are provided in the form of a method for providing a user interface for an industrial control system wherein information is presented at least in part displayed in layers on one or more display screens of a control system, the method further comprising the action of automatically loading representations of one or more items of said information dependent on attributes of a user profile such as job description, authority, shared authorities, location, user preferences.

According to another aspect of an embodiment of the invention improvements are provided in the form of a method for providing a user interface for an industrial control system wherein information is presented at least in part displayed in layers on one or more display screens of a control system, the method further comprising the action of automatically loading representations of one or more items of said information dependent on any of a process status, task for process, user profile.

According to another aspect of an embodiment of the invention improvements are provided in the form of a method for providing a user interface for an industrial control system wherein information is presented at least in part displayed in layers on one or more display screens of a control system, the method further comprising the action of generating a presentation scheme based on one or more representations or presentations of one or more items of said information comprising any from the group of: real time numerical value, real time graphical value, real time text values, static text, dynamic text, static mimic, dynamic mimic, sound signal, alarm sound, static visual effect, dynamic visual effect, haptic effect, any combination of visual, sound, haptic.

According to another aspect of an embodiment of the invention improvements are provided in the form of a method for providing a user interface for an industrial control system wherein information is presented at least in part displayed in layers on one or more display screens of a control system, wherein the load order for a said one or more layers is determined so as to reduce the loading time required before each of a series of the one or more said layers may be viewed at least in part.

According to another aspect of an embodiment of the invention improvements are provided in the form of a method for providing a user interface for an industrial control system wherein information is presented at least in part displayed in layers on one or more display screens of a control system, the method wherein the load order for a said one or more layers is determined in a priority dependent on importance of one or more representations of one or more items of said information.

According to another aspect of an embodiment of the invention improvements are provided in the form of a method for providing a user interface for an industrial control system wherein information is presented at least in part displayed in layers on one or more display screens of a control system, the method wherein the load order for a said one or more layers is determined in a priority dependent on which of one or more representations of one or more items of said information shall be displayed or presented most prominently.

According to another aspect of an embodiment of the invention improvements are provided in the form of a method for providing a user interface for an industrial control system wherein information is presented at least in part displayed in layers on one or more display screens of a control system, the method wherein the load order for a said one or more layers is determined in a priority including one or more representations of one or more items of said information that may be omitted from the load. According to another aspect of an embodiment of the invention improvements are provided in the form of a method for providing a user interface for an industrial control system wherein information is presented at least in part displayed in layers on one or more display screens of a control system, the method wherein the load order for a said one or more layers is determined in a priority dependent on any of a user preference or a user profile, or a role of a current user and the user profile.

According to another aspect of an embodiment of the invention improvements are provided in the form of a method for providing a user interface for an industrial control system wherein information is presented at least in part displayed in layers on one or more display screens of a control system, wherein the role of a current user and/or the user profile may comprise, and is not limited to, any from the group of: process operator or other person with responsibility for a part of the process, field operator, process supervisor, maintenance person, remote expert, local expert, person with responsibility for other staff, person with responsibilities during an emergency or rescue situation.

According to another aspect of an embodiment of the invention improvements are provided in the form of a method for providing a user interface for an industrial control system wherein information is presented at least in part displayed in layers on one or more display screens of a control system, by which method the selection of which of the layers shall be presented or visually displayed prominently, or displayed less prominently, or hidden may be changed manually by a user.

According to another aspect of an embodiment of the invention improvements are provided in the form of a method for providing a user interface for an industrial control system wherein information is presented at least in part displayed in layers on one or more display screens of a control system, wherein according to the method the selection may be manually changed or configured to be persistent across sessions, persistent for single user, user group or all users, for the single display or for all displays, for the single work station or system wide.

According to another aspect of the invention improvements are provided by an embodiment in the form of a user interface for an industrial control system wherein information is presented at least in part displayed in layers on one or more display screens of a control system, in which said control system a plurality of process graphics and other presentation schemes and/or devices provide said information held by said control system, wherein the user interface comprises means for loading content for said one or more layers which content has been determined based on said information available from said control system and means for calculating which of the available items of said information shall be visually displayed or otherwise presented prominently, or displayed less prominently, or hidden.

According to another embodiment of the invention improvements are provided in the form of user interface for an industrial control system wherein information is presented at least in part displayed in layers on one or more display screens of a control system, the user interface comprises means for automatically loading representations of one or more items of said information dependent on a status of a process controlled by said control system, the status comprising and not limited to any from the group of: start, run, process change, event, alarm, stop, offline, configuration or maintenance, simulation.

According to another embodiment of the invention improvements are provided in the form of user interface for an industrial control system wherein information is presented at least in part displayed in layers on one or more display screens of a control system, wherein the user interface comprises means for automatically loading representations of one or more items of said information dependent on a task for an operator, the task comprising and not limited to any from the group of: start up, operate, change operation, alarm handling tasks, specific process related tasks, maintenance, shut down.

According to another embodiment of the invention improvements are provided in the form of user interface for an industrial control system wherein information is presented at least in part displayed in layers on one or more display screens of a control system, wherein the user interface comprises means for automatically loading representations of one or more items of said information and displaying a first layer when loaded completely and before one or more other said layers have loaded.

According to another embodiment of the invention improvements are provided in the form of user interface for an industrial control system wherein information is presented at least in part displayed in layers on one or more display screens of a control system, wherein the user interface comprises means for automatically loading representations of one or more items of said information for display or other presentation dependent on attributes of a user profile such as job description, authority, shared authorities, location, user preferences.

According to another embodiment of the invention improvements are provided in the form of user interface for an industrial control system wherein information is presented at least in part displayed in layers on one or more display screens of a control system, wherein the user interface comprises means for automatically loading representations of one or more items of said information for display or other presentation dependent on any of a process status, task for process, user profile.

According to another aspect of the invention improvements are provided by an embodiment in the form of an industrial control system wherein information is presented at least in part displayed in layers on one or more display screens of a control system, in which said control system a plurality of process graphics and other presentation schemes and/or devices provide said information held by said control system, wherein information is presented at least in part displayed in layers on one or more display screens of a control system, in which said control system a plurality of process graphics and other presentation schemes and/or devices provide said information held by said control system, wherein the user interface comprises means for loading content for said one or more layers which content has been determined based on said information available from said control system and means for calculating which of the available items of said information shall be visually displayed or otherwise presented prominently, or displayed less prominently, or hidden.

According to another aspect of the invention improvements are provided by an embodiment in the form of an industrial control system wherein information is presented at least in part displayed in layers on one or more display screens of a control system comprising means for automatically loading said one or more layers based on any from the group of a process status, operator task, user profile, event or alarm.

According to another aspect of the invention improvements are provided by an embodiment in the form of an industrial control system wherein information is presented at least in part displayed in layers on one or more display screens of a control system comprising means for multi-media presentation of information which may also comprise means for generating haptic signals.

According to another aspect of the invention improvements are provided by an embodiment in the form of an industrial control system wherein information is presented at least in part displayed in layers on one or more display screens of a control system comprising computer program means for presenting one or more multi media human-machine interfaces based on said layers.

One idea behind an embodiment of the invention described here is that the information in the control system user interface is layered in order to adjust the information presentation to the perception capabilities of control room operators. The different "information objects" are grouped into logical layers, meaning layers that can also be turned on or off. It should be noted that there are some types of information that should not be allowed to be turned off in particular situations or even in all situations, such as e.g. alarm information, —so there may be a basic layer that is always present in the user interface. On top of this there can at any given time be one or more or more additional layers.

There are many possibilities for how these information objects can be grouped. E.g. they can be grouped according to presentation mode (e.g. textual, graphical, auditory, visual), data type (current/historic, analog/digital), functional aspects (electrical, process, cooling system, fire & gas, etc) or other logical groupings.

In a visual presentation mode through use of transparency or colouring, the different layers can be given greater or lesser prominence in the visual display depending on the significance of the information contained in the layer relative to the current operating situation. The selection of which layers are switched on or off and which of the active layers that are given prominence in the display can be done either automatically by the control system, or manually by the operator. In automatic mode, the advantage is that the system may be determined to be context sensitive, such that the user is for example only presented with information that is necessary. In manual mode, the operator is able to explore the system and find information he/she needs about specific technical issues.

Another aspect of the invention is that the grouping of visual/graphical information into layers can also be used to determine how the computer should load the graphics when opening a new process view. In most current systems, the different graphical objects in a process graphics are loaded in a random manner, and it might be that the least relevant information is loaded first. It often takes several seconds before some process graphic screens have been processed, loaded and presented, at which point the operator can decide if the information is relevant or required. It is important to note that it is most common not to show anything until all data is available and updated to current state. This is meant to avoid confusing the operator. In this respect, loading layers in an ordered fashion makes it possible to show information at an earlier stage than with traditional systems. As it often takes several seconds before a whole page is loaded, it would be beneficial if the operator could determine more quickly if this was the page she was looking for; and if not, to navigate to the next without having to wait for the whole page to load. This would reduce the time spent on finding the relevant information, which may be absolutely critical in, for example, a hazardous situation.

In another aspect of the invention the layering of information could also be used to provide different representations of the same data that could be presented to the user or operator. For example the current measurements for a valve could be represented as a number, a trend graph, a pie chart, a sound, a vibration signal or another presentation format. These representation forms could be presented to the operator simultaneously or separately. As described above for in respect of layers, the layers may be presented automatically by the system eg in a context-aware way, or selected or adjusted manually by the operator. It is also possible that information/data from several objects might be aggregated into one information object, and that this could be arranged in a separate layer. For example the combined output of all the pumps in a graphic could be presented in a separate layer.

Layering might also be called filtering. Each layer might be a regarded as a kind of filter to remove all information except the information to be presented in this layer, which would then produce the same output as the layer concept described above.

Configuration and interaction with the layering technique can be related to a system, a state of the system, a specific user task, different types of users and to accompany specific user preferences as recorded for example in user profile, user or needs. There are then many different uses of the layering technique which is facilitated by arranging that there are multiple ways for the user to interact with the layers. Examples of interaction methods for graphic user interfaces are:

Using a toolbar style interaction
  Direct interaction in the process graphics through button style choices
  Context menu entries
  Custom context menu for layers only with a different invocation interaction than the standard context menu (i.e. SHIFT+Left Click)
  Fast and direct access through hotkeys/shortcut keys
  Drop-down menus
  Computer input means such as keyboard, computer mouse, touch screen etc may be used, and/or used in combination with graphic user interface techniques.

On a system level it is important to relate the layers to an application of the system or a task that is to be preformed. In many cases a process graphic or the representation may be directly linked to a control object or a configuration setting. In this case it is advantageous to provide the available choices in a drop-down menu that is not part of the process graphics but more a part of the operator workplace. It is also possible to implement this as specific workplaces tailored to the application or task to be preformed, in which the user is not able to change the layer settings for the specific workplace layer from inside the workplace. These specific workplaces use the layering technique to present the appropriate information for the application or task.

When layers are related to a state of the system, the user requires more choice regarding the layers. It can be desirable both for the system to set the layers automatically and for the user to choose between different configurations directly.

When the system has many layers, it is advantageous to group the layers into logical entities. For example, the use of a command called "process startup" may turn on all the layers that are relevant for starting up a process, while another command would turn some of these off and others on.

The advantages include:
  The proposed solution makes it easier for operators to find the relevant information in a critical situation, as the operator's view is less cluttered with unnecessary information;
  The information in the control room interface is adjusted to the operator's perception capabilities, hiding unnecessary information in normal operating mode while at the same time providing means for the operator to locate this information on demand;
  The user interface can be automatically adjusted according to operator preferences, current work task or system state;
  There are several advantages related to using layers to determine load sequence of the graphics on a page. Firstly, it can reduce the total time needed to load the graphics as some of the layers might be invisible on startup, hence less graphical objects are loaded into memory. Secondly, the operators can find the relevant information quicker, because the most important information is displayed first. This is especially important in cases where the operator is searching for information that he/she doesn't know exactly where is located. This enables the operators to switch to another page earlier without having to wait for the whole page to load. This is an improvement compared to today's rather slow solutions where the graphics are either loaded in a random order or the displaying of the graphics is postponed until all objects are loaded and have updated system data in order not to confuse operators.

This invention proposes a system for structuring the information that is available from the process plant into layers in the user interface. The layers can be visible, invisible or partially visible. The visibility of the layers can be adjusted in different manners; by the operators themselves, by the control system or by a combination of these. The control system might use information about process state, alarms, work situation (context) or stored knowledge about the operator (automatic personalization) to automatically adjust the information presentation. The operator might be able to change the visibility of layers as a manner to explore the system or to get specific information when necessary.

It should also be noted that the control room interfaces are not necessarily purely visual, e.g. alarm signals are represented by both sound and visual effects. It is probable that this will increase in the future in order to exploit human perception capabilities further. The concept of layered information is not restricted to only visual interfaces, but might also concern audible, tactile/haptic or other modalities.

This invention describes a system for and a method of using layering in information presentation in industrial supervision, maintenance and control. There are at least four aspects of or dimensions to this invention:

The concept of layers in itself: the use of layers to group information and to selectively show/hide/highlight these layers for run-time operation for industrial control
  The interaction with the layers: automatic vs. manual; how the manual interaction may be done The use of layers in conjunction with loading order prioritization to reduce the loading time and the time to find relevant information for the current task or situation Engineering methods for information layers and for linking the representations in a layer to information, control objects and other objects held by or accessible via the control system.

The first aspect regards the use of layers in itself. By grouping information into layers the information presented to the user can be customized to the users' preferences, work task or the current system state.

The second aspect is related to how the interaction with the layers is done. The selection of which layers are turned on or off and which active layers are given prominence in the display can be done automatically by the control system. The advantages of this are that the user interface adapts according to user preferences, system state or current work tasks. In manual mode the operators must have an effective interface for selecting and de-selecting the different layers. The advantage of this mode is that it supports active exploration into the system by the operators. In an advantageous development the layer control system may also adapt to user actions and "learn" which preferences are more important to the user.

If the layers are related to prioritization levels, the process graphics can be loaded in a controlled order. This has several advantages. Firstly, as some layers are invisible there are fewer objects to load, hence a reduced loading time. Secondly, the operators can find the relevant information quicker, because the most important information is displayed first.

The fourth aspect concerns how layered information presentation systems can be engineered. By ensuring a close tie-in to the objects in an object-oriented control system, the engineering of such systems does not require significant additional work for engineering personnel.

Embodiments of the invention may advantageously used for control purposes in a control system of an oil or gas storage, treatment or process installation. Embodiments of the invention may also be used for control purposes in a control system for other industrial, manufacturing or process installations, such as in the pulp & paper, oil & gas, chemistry & life sciences, and transportation industries (such as railway control systems), and also used in an installation for generation, transmission or distribution of electrical energy.

In a preferred embodiment of the methods of the invention one or more methods may be carried out by a computing device comprising one or more microprocessor units or computers. The control unit(s) comprises memory means for storing one or more computer programs for carrying out the improved methods for controlling the operation of a mechanical press. Preferably such computer program contains instructions for the processor to perform the method as mentioned above and described in more detail below. In another embodiment the computer program is provided on a computer readable data carrier such as a DVD, an optical or a magnetic data device.

BRIEF DESCRIPTION OF THE DRAWINGS

Embodiments of the invention will now be described, by way of example only, with particular reference to the accompanying drawings in which.

DETAILED DESCRIPTION OF THE EMBODIMENTS

Figure 1:
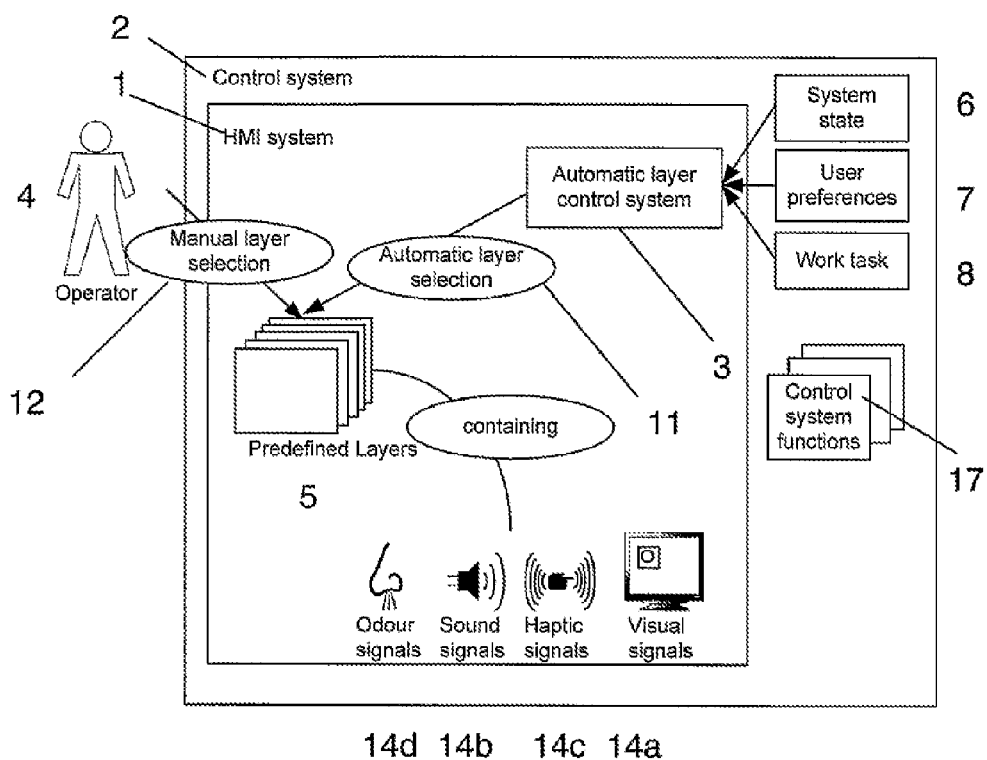
FIG. 1 is a schematic diagram for an improved user interface for an industrial control system wherein information is presented at least in part displayed in layers according to an embodiment of the invention.

This invention describes a system for and a method of using layering in information presentation in industrial supervision, maintenance and control.

The trend towards operation from remote operation centres introduces an increase in both the control room operators' work domain and the workload as several different processes can be supervised and controlled in parallel. Information layering can be used to overcome screen limitations and reduce the cluttered look typical for the traditional process graphics which are often dominated by static information presented with thick lines and vibrant colours.

Layering technology is a well known principle in cartography, where visual layering is used to help users segment the display into task relevant visual planes or layers. However, this solution takes this principle further by suggesting to use layering to display task relevant information also in real-time operation, where the layering technology can be used to switch between presentations of the same information by use of different presentation elements or between logically grouped information that is pre-determined or automatically detected by the system to be relevant for a specific user, process state or user work task.

The different layers can be given a priority according to task relevance to control the prominence the information will take in the process display and the priority of loading the information will have when a new display is opened by the user.

This invention describes then a system and method for providing context-sensitive information in process displays used for supervision and/or control of industrial processes. The system comprises:

- Data/information from control system
- Presentation element (information object)
- Presentation layer with attributes such as priority, transparency, etc
- Link between presentation element or data set and presentation layer
- Possibility to select layers through direct manipulation
- Select relevant layers automatically based on manual or automatic detection of the user's preference, work task or of the system state.

The invention relates to systems that are used by operators in control rooms today, but might also be very relevant for new types of control room interfaces. Current control room interfaces are normally based on desktop computers with one or more desktop monitors and/or one or more large screens. The concept could be used in such a setting, but it could also be used for mobile interaction devices such as tablet-pc's, mobile phones, electronic paper, virtual or augmented reality systems, PDAS, multi-modal interfaces, etc.

The method can be used on any system for process information visualization that is used to present groups of information that can be of varying relevance to the operator depending on the current context. The process visualization system can for example be P&ID based graphics, abstraction hierarchies, model-based representations, 3D visualizations or abstract visualizations of process information. A 3D representation of an industrial process arranged in conjunction with a control system is described in U.S. 60/667,080, which specification is hereby included in its entirety by means of this reference. The 3D model described may be arranged to display representations and/or values from a process or equipment, which representations and/or values may be arranged in layers depending, for example, on functional or location-based groupings of equipment, components or process stages.

Figure 2:
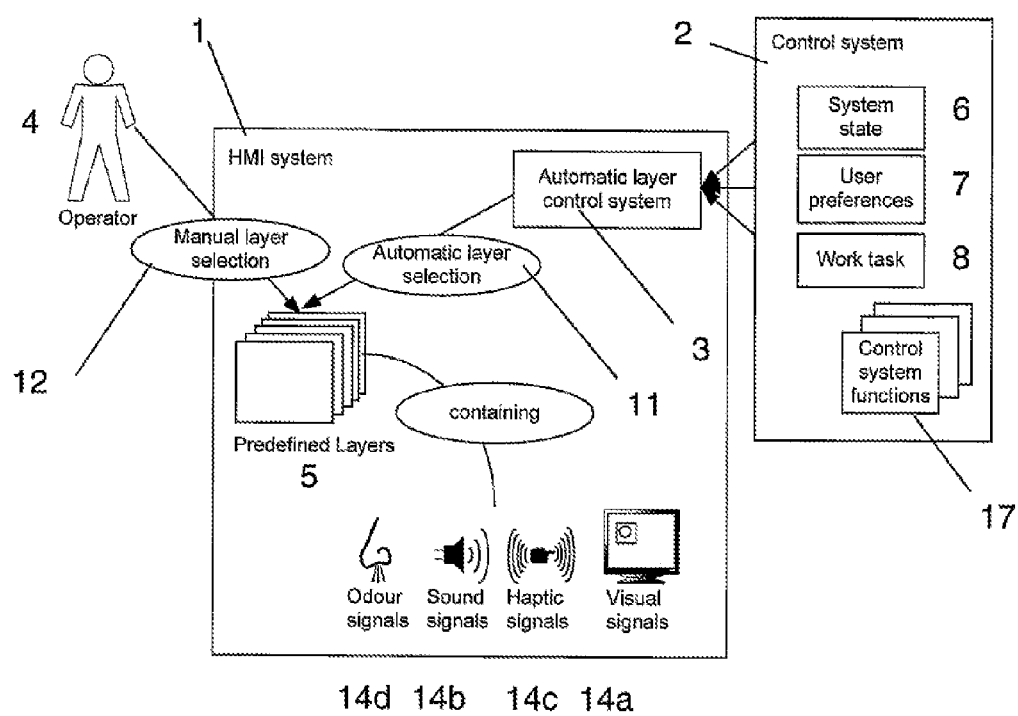
FIG. 2 is a schematic diagram showing an improved user interface for an industrial control system according to another embodiment of the invention.

FIG. 1 shows a control system 2 including an integrated HMI interface 1. The interface includes predefined layers 5, and automatic layer control system 3. The automatic layer system 3 has inputs for at least information and data on system state 6, user preferences 7, and current work task 8. System components (system state, user preferences, work tasks, may be internal or external to the control system. The automatic layer control system 3 has means to make automatic selections 11 regarding content of the layers 5. An operator 4 may make manual selections 12 regarding the content of the layers 5. The layers may contain representations for visual images and signals 14a, and also non visual signalling means, such as sound signals 14b, haptic signals 14c such as mechanical vibrations, mechanical resistance to movement of controls, or even odour signals 14d. FIG. 2 shows a similar interface 1, an HMI, which in this case is an external system and is not integrated into the control system 2.

A method according to an embodiment of the invention is to group information objects into logical layers and to selectively present these layers to the operator. The information objects can be either visual, audible, tactile or in other modalities, and the selection of a layer of such objects will determine whether the information will be presented to the operator or not.

The grouping of these information objects can be done according to many different criteria. Examples might be to group objects according to presentation mode (e.g. textual, graphical, auditory, visual), data type (current/historic, analog/digital), functional aspects (electrical, process, cooling system, fire & gas, etc) or other logical relationships. See for example FIGS. 3 and 4.

Figure 3:
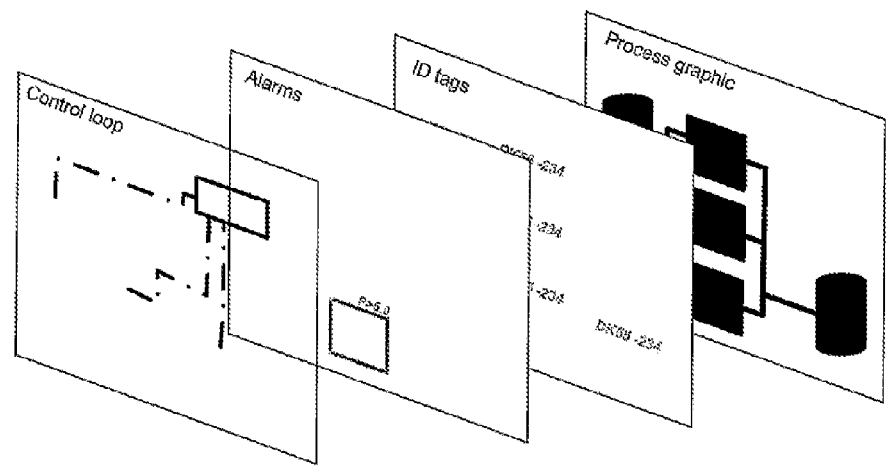
FIG. 3 is a schematic diagram showing layers in an improved user interface for an industrial control system according to another embodiment of the invention.

FIG. 3 shows an example for layers in which four layers are shown, each one visually presenting a different functional view of the same process section, a control loop 5a, an alarm diagram 5b, a display of equipment IDs (Identification tags) and a process graphic 5d.

Figure 4:
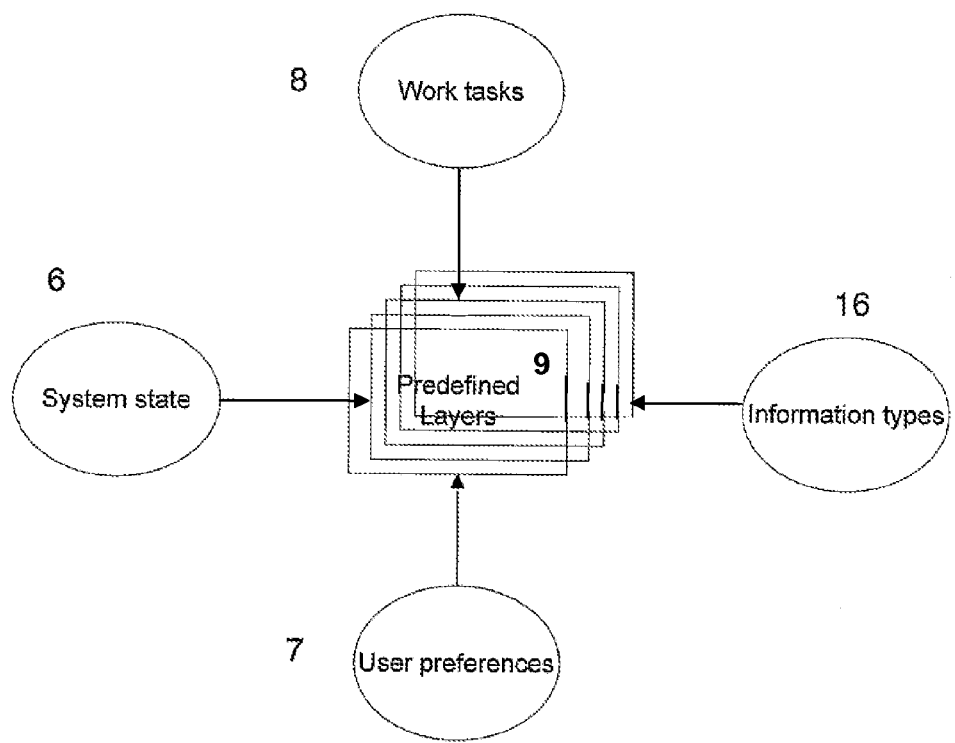
FIG. 4 is a schematic diagram for determinants of layer content according to an embodiment of the invention.

FIG. 4 shows how layers comprise system information components of system state 6, user preferences 7, (current) work tasks 8, predefined layers 9, and information types 16.

There are at least two basic alternatives for how this might be implemented in a system, either automatic selection of layers or manual. These two alternatives might also be combined.

FIGS. 1 & 2 show a schematic arrangement for a system according to an embodiment of the invention, with the plurality of predefined layers 5, an operator 4, an automatic layer control system 3, and conditions or constraints of the automatic system layer control system, such as system state 6, user preferences 7, work task 8.

When layers are used for automatic information adjustment, the system can take working practices and preferences of the current operator into consideration, as well as information about the process state and the current work tasks of the operator. The system can, for example, combine knowledge about the operator and the process state to present the information in a specific manner if the process is in a startup phase. When reaching normal operating mode the interface can switch to another set of information layers that is more suitable.

In manual mode, the operator can switch the individual layers on or off and give prominence to the active layers manually. This allows the operator to find the necessary information when it is needed, without displaying all the information all the time. For example, static textual information holding the IDs of the equipment is often irrelevant information in a normal operating mode, but when a field operator calls in to ask about a pump or valve, the 'ID'-layer might be switched on to make sure they are talking about the same piece of equipment.

Figure 5:
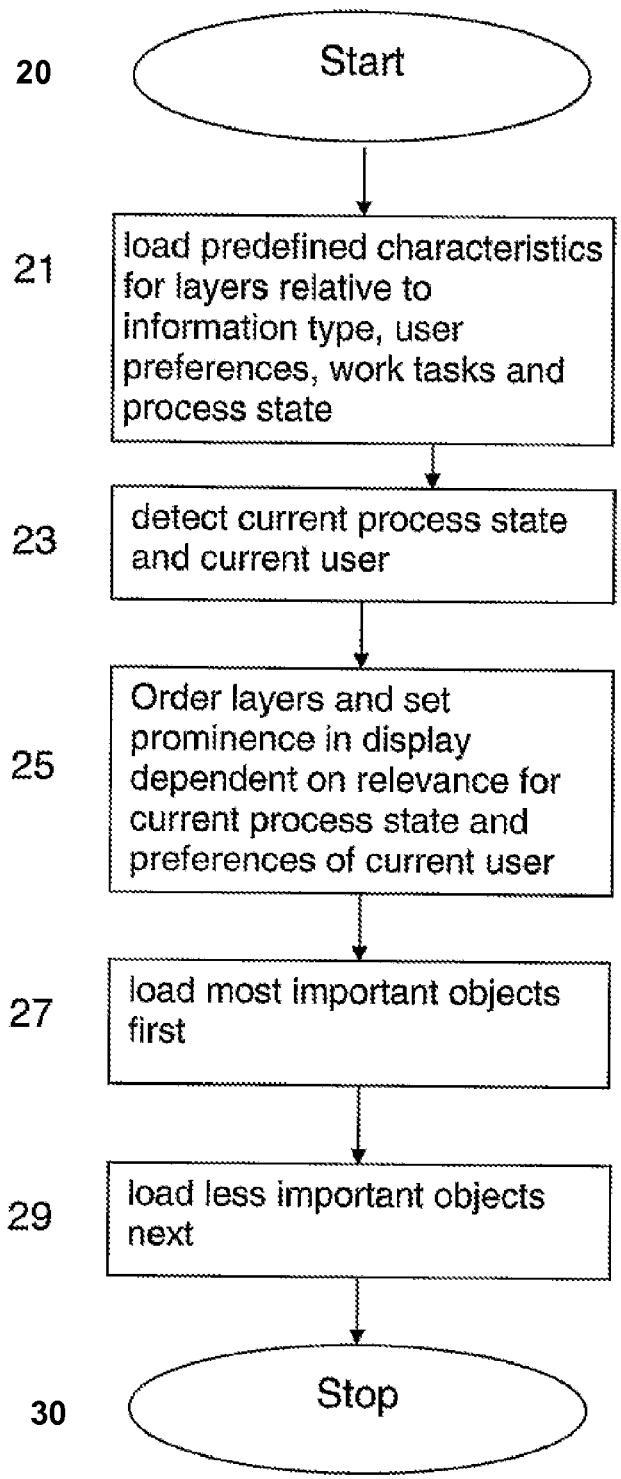
FIG. 5 is a schematic flowchart of steps for automatically loading information items into a layer according to an embodiment of the invention.

FIG. 5 shows a flowchart for an automatic type of method. It comprises actions of:
- 20 starting the method;
- 21 load predefined characteristics for layers, relative to information type 16, user preferences 7, work tasks 8 and process or system state 6;
- 23 detect current process or system state 6 and current user;
- 25 order layers and set prominence in display or other presentations dependent on relevance for current process or system state and preferences of current user;
- 27 load the most important information item objects first
- 29 load the less important information item object next
- 30 Stopping the method.

Figure 6:
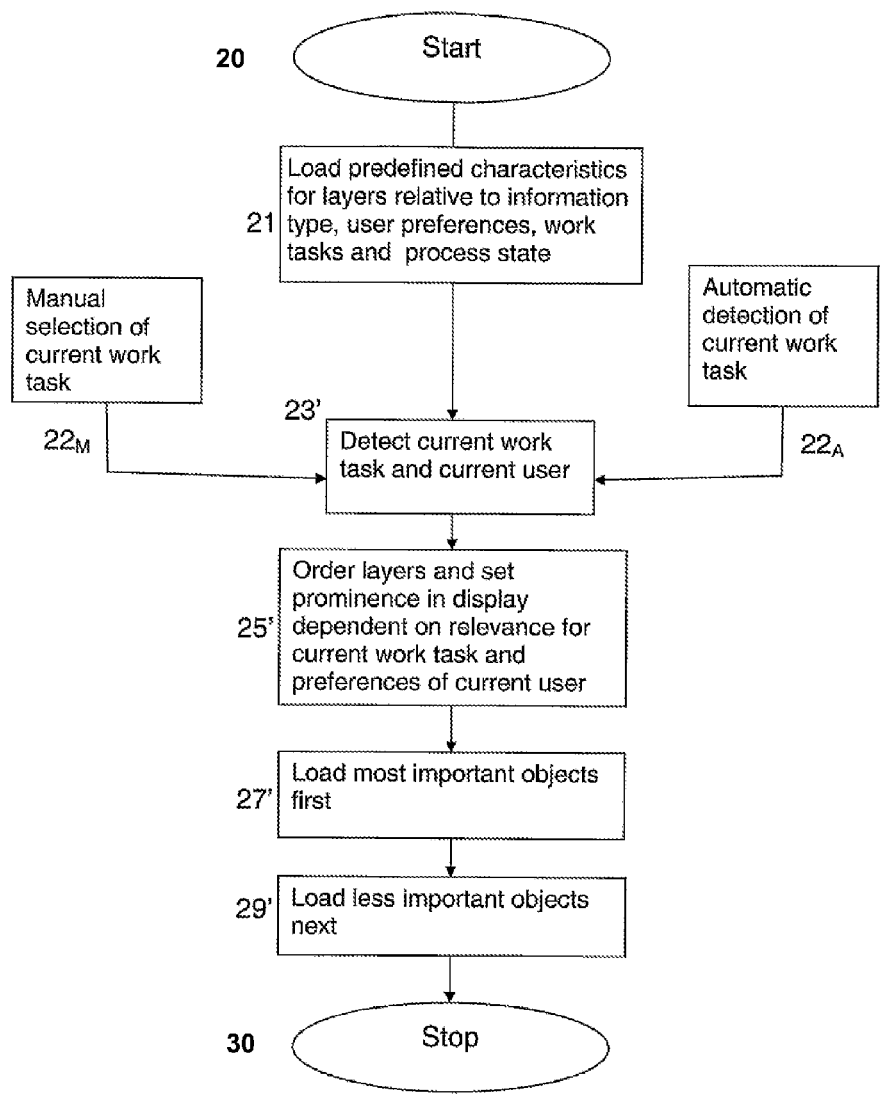
FIG. 6 is a schematic flowchart of steps for automatically loading certain information items into a layer with manual selection of a current work task according to another embodiment of the invention.
Figure 7:
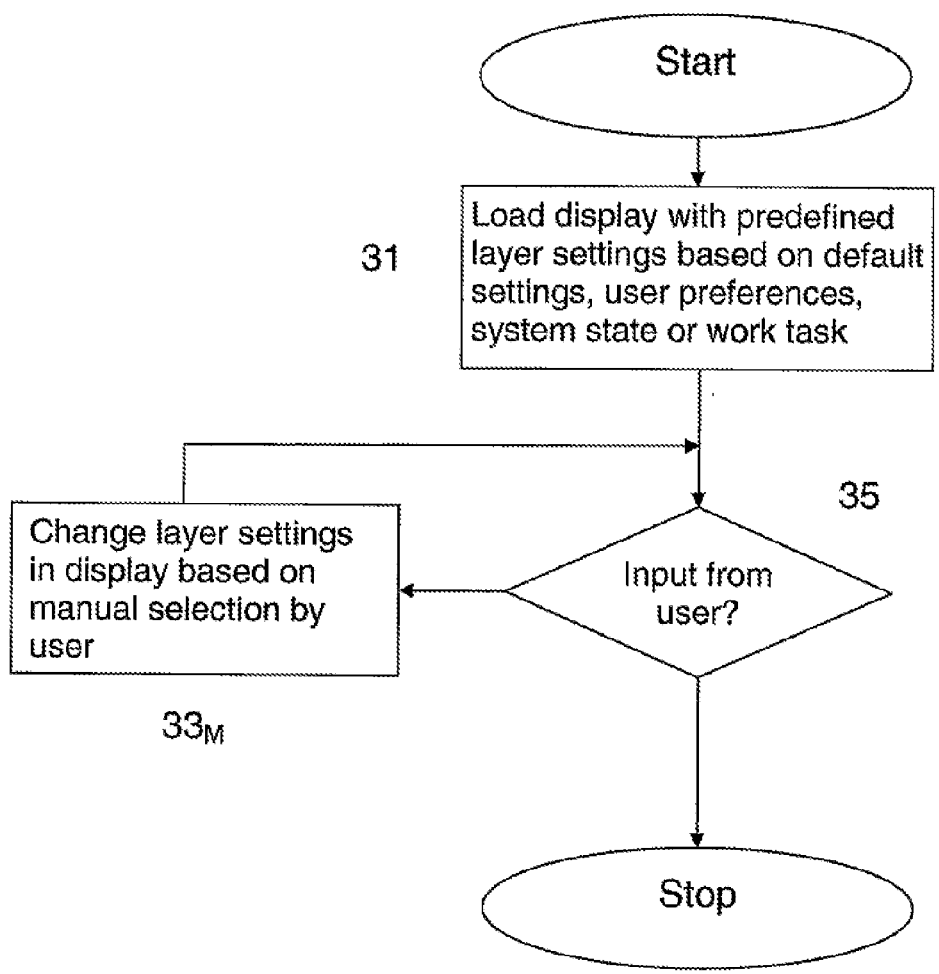
FIG. 7 is a schematic flowchart of steps for manually changing layer settings of an active display with user input according to an embodiment of the invention.

FIG. 6 shows a flowchart for an adaption of the automatic type of method. It comprises actions of:
- 20 starting the method;
- 21 load predefined characteristics for layers, relative to information type 16, user preferences 7, work tasks 8 and process or system state 6;
- 22$_M$ Manual selection of work task 8, and/or
- 22$_A$ Automatic detection of current work task 8,
- 23' detect current process or system state 6 and current user;
- 25' order layers and set prominence in display or other presentations dependent on relevance for current process or system state and preferences of current user;

27' load the most important information item objects first
29' load the less important information item object next;
30 Stopping the method.

In performing different tasks and in the supervision of different process states, the operator will have different requirements for information. That means that the information presented needs to be context sensitive. An example of a state of a process that creates specific information needs and increased workload for the operator is start-up and shutdown of the plant. By showing the information layers that contain the relevant information for the current process state or operator task prominently and by 'fading out' or even removing information that is not needed, the operators' workload during operation in these process states can be reduced. A common feature in systems for process control is to allow the operator to make notes or annotations in the system, related to certain equipment in the plant. During normal operation this information may not be relevant, but when an abnormal situation comes up for a piece of equipment knowing prior history will be of high relevance. The system may then show this information automatically or the operator can manually switch on the information layer containing information on what equipment have attached operator notes and the date and name of the operator that created the last note. The layer can also be configured to contain information from the maintenance history of the equipment, such as the last maintenance date.

Maintenance personnel need specific information in order to plan maintenance, such as run-time measurements, vibration measurements, maintenance alerts/alarms, active or past work orders connected to the equipment etc. Specific layers with maintenance information can be made available to maintenance personnel, allowing him or her to work in the same system as the control room operators but with different information presented.

In normal operation, the control room operator does not need to use or remember the exact equipment name for the equipment being supervised or controlled. However, in a situation where the control room operator is communicating with a field operator or a remotely located expert over a radio link or telephone, the unique equipment name is an important reference point between the personnel situated at different physical locations and with different information available. The control room operator can in such a situation choose to switch on the layer containing label names or ID tags in the process visualisation system, or the system can switch it on automatically as it detects that the operator is performing a task where equipment name information is needed.

A layer containing active work orders connected to certain process equipment or in a certain area of the plant can be shown to help give the operator or maintenance personnel an overview of current activities in the plant.

During emergency operation a layer containing personnel location can be added to a map of the plant.

Figure 8:
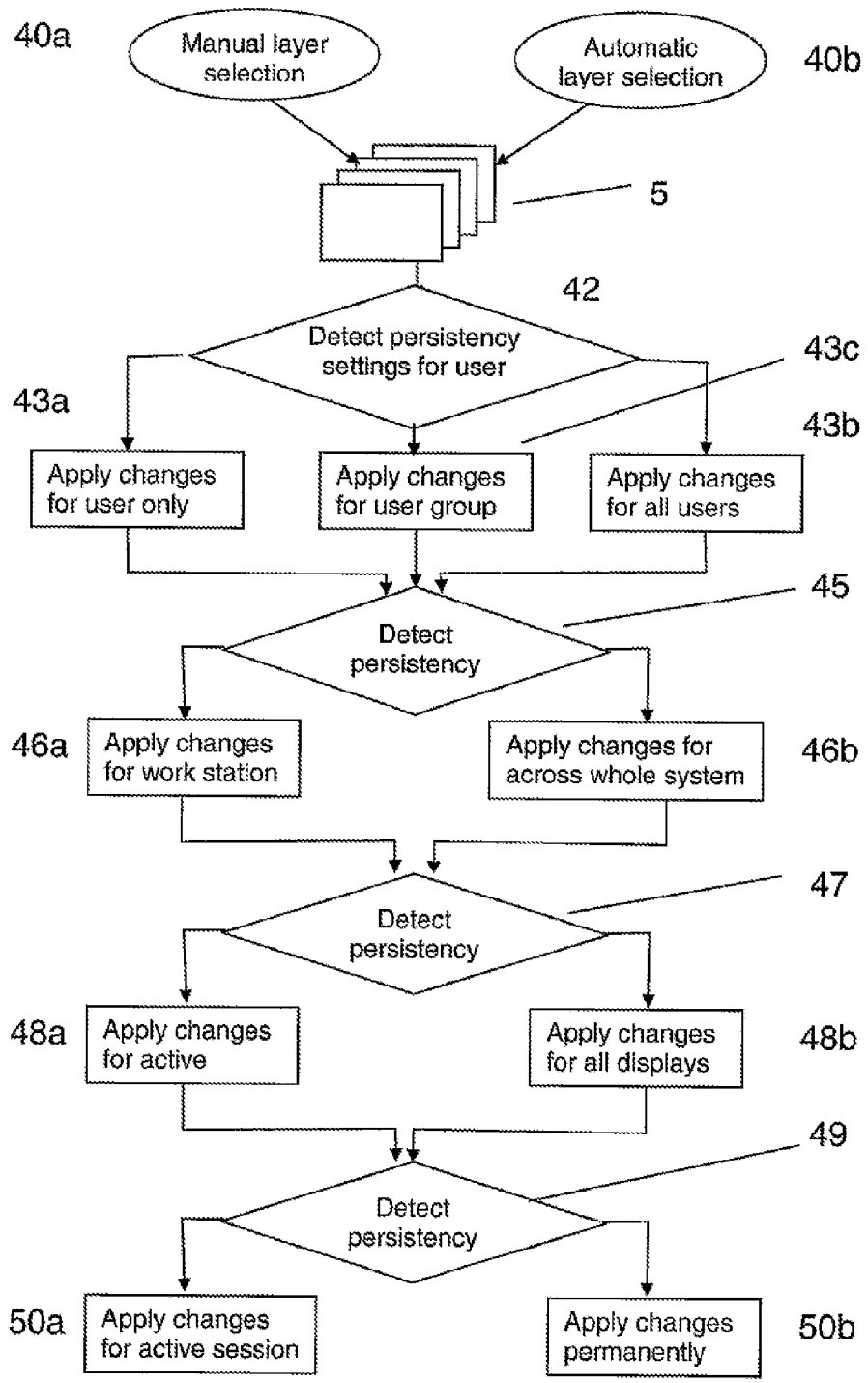
FIG. 8 is a flowchart of actions for making settings for persistency under different user and session situations according to another embodiment of the invention.

Changes in layer settings may be configured to be persistent across sessions, persistent for single user, user group or all users, for the single display or for all displays, for the single work station or system wide. This is summarised in an exemplary flowchart FIG. 8, which comprises the actions of:
40$_M$ Manual layer selection and/or 40$_A$ automatic layer selection
42 detecting persistency settings for a user
43*a* applying changes for user only, 43*b* for user group, 43 applying changes for all users;
45 detecting persistency settings for presentation=display
46*a* apply changes for workstation only, 46*b* apply across whole system;
47 detect persistency changes for system
48*a* apply changes for active display only, or 48B apply changes to all displays;
49 detect persistency settings for session;
50*a* apply changes in active session only, or 50*b* apply changes permanently.

Thus persistency per user of layer settings in respect for example of user preferences, system state, current work task etc may be differently configured to meet the requirements of different situations.

When engineering the layers several aspects of the layer configuration have to be taken into account. As described earlier in relation to FIGS. 1-3 the layers can be engineered to relate to working tasks, system status, information types and user preferences. There are at least two basic ways to relate presentation objects to layers. The layers can either be predefined to include a set of objects or configured based on properties of the presentation objects. These two approaches are not exclusive and a single object can relate to both predefined layers and to a local layer for a group of presentation objects used in a single presentation. Predefined layers may relate to work tasks, system states, user preferences or information types. Local layers may for example relate to system states, user preferences and information types.

For engineering related to working tasks both manual and automatic layer selection has to be configured. Manual layers can be related to a work process so that the user may choose to highlight, subdue, hide or show a layer based on what work tasks he or she is most interested in. Automatic layer selection relates to work tasks so that the system may automatically highlight, subdue, hide or show information based on the current work task.

Another aspect to consider when engineering layers is system states. This may be configured so as to influence what information is highlighted, subdued, hidden, shown or conveyed to the user.

User preferences may influence engineering of both manual and automatic layers.

A layer can be based on any combination of system states, work tasks user preferences and or information types.

Configuring the layers may relate to selection of objects, structures of objects, parts of structures of objects or aspects of objects or any combination of these.

An important aspect of the engineering function is to engineer to achieve optimal loading performance of a presentation object. This may be for any task, such as to find relevant data, to find decision critical data, for quick navigation purposes, to satisfy a system state, to satisfy a specific work task and/or for adapting to user preferences.

Figure 9:
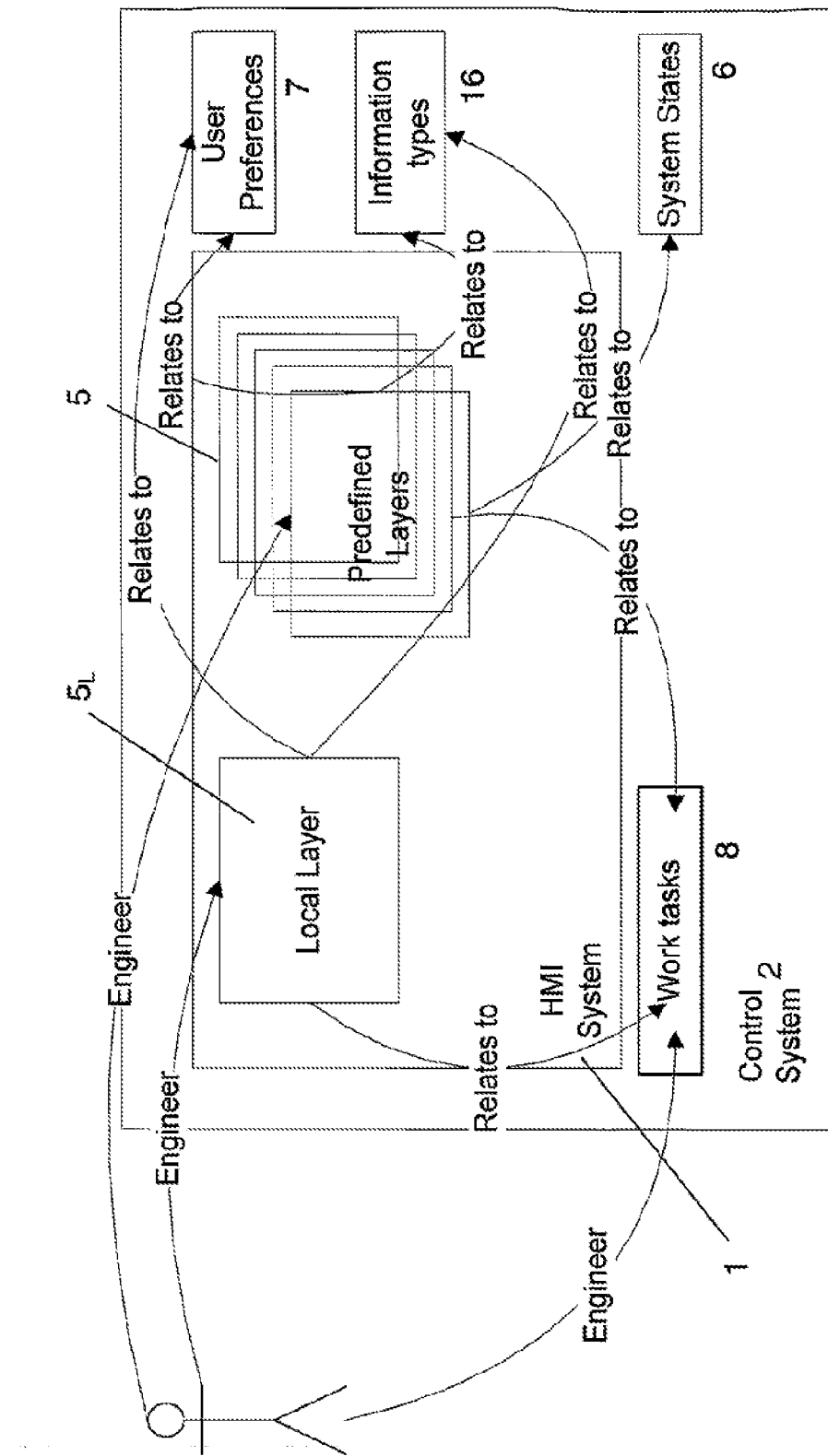
FIG. 9 is a schematic block diagram for showing engineering relationships between the layers, the information items comprised in the layers and the industrial control system.

FIG. 9 displays a schematic arrangement for engineering or configuring layers to an industrial control system. FIG. 9 shows a local layer 5$_L$ which may for example relate to the work tasks 8, user preferences 7 and information types 16 shown. The predefined layers 5 may relate to the system states 6, as well as the work tasks 8, user preferences 7 or information types 16 as shown.

Figure 10:
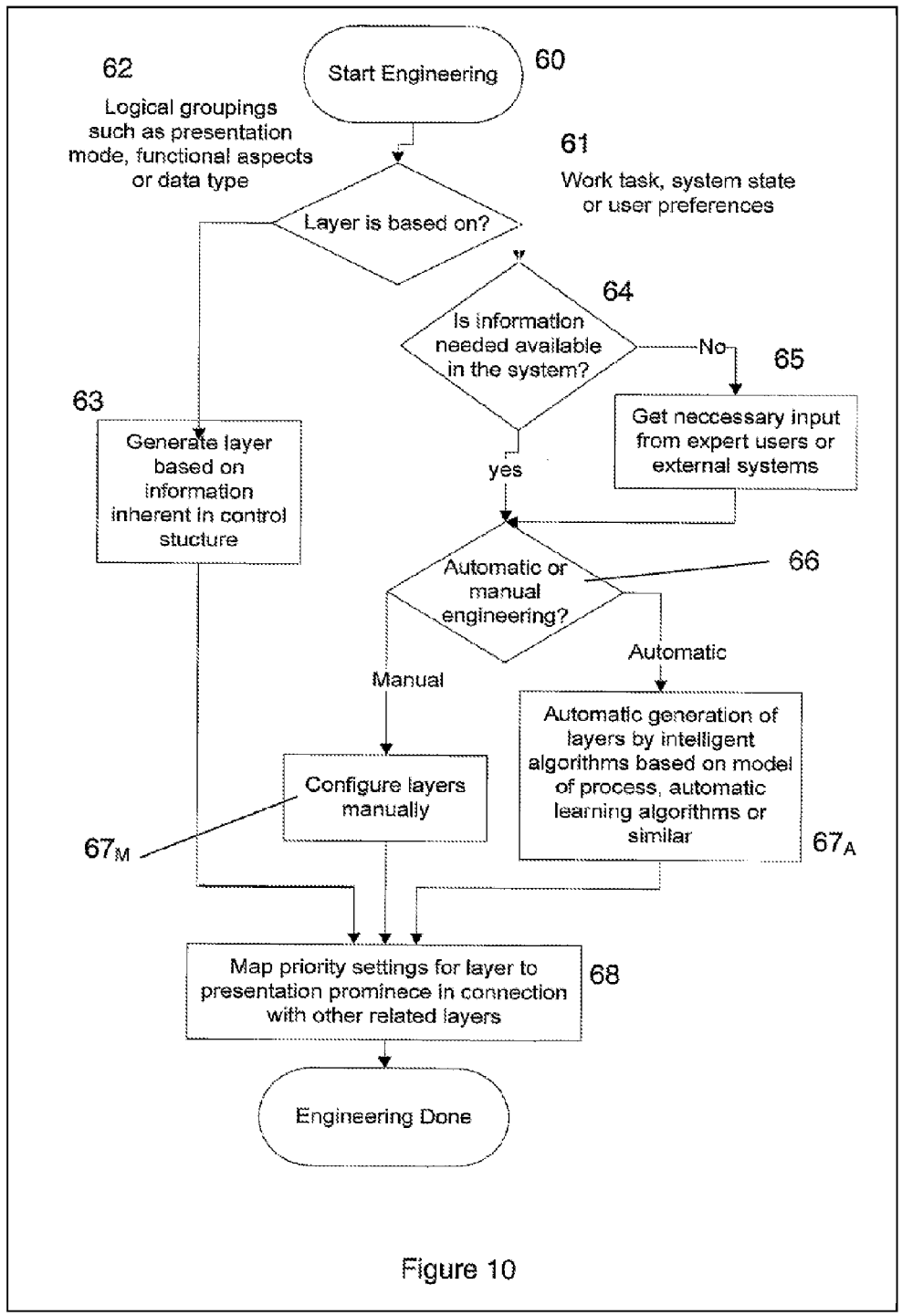
FIG. 10 is a schematic flowchart of steps for engineering relationships between the layers or the information items comprised in the layers and the industrial control system and information sources and setting priorities for prominence of a layer compared to other layers according to an embodiment of the invention.

FIG. 10 shows a simple flowchart for engineering methods which comprise the actions of:
60 layer to be based on either
62 logical groupings such as presentation mode, functional aspects or data type, or
61 any combination of work task, system state, user preferences;
62 leads to 63, generate layer based on information inherent in the control structure, then to step 68
61 leads to
64 is the necessary information available in the system; No—

65 get necessary information form expert users or expert systems or external systems;
66 select automatic or manual engineering; for automatic—
$67_A$ automatic generation of layers by intelligent algorithms based on model of process, automatic learning programs or similar; or
$67_M$ configure layers manually;
68 Map priority settings for layer to presentation prominence in connection with other related layers;
70 Completing Engineering.

One or more microprocessors (or processors or computers) comprise a central processing unit CPU performing the steps of the methods according to one or more aspects of the invention, as described for example with reference to FIGS. 5-8 and/or 10. The method or methods are performed with the aid of one or more computer programs, which are stored at least in part in memory accessible by the one or more processors. It is to be understood that the computer programs for carrying out methods according to the invention may also be run on one or more general purpose industrial microprocessors or computers instead of one or more specially adapted computers or processors.

The computer program comprises computer program code elements or software code portions that make the computer or processor perform the methods using equations, algorithms, data, stored values, calculations and the like for the methods previously described, for example in relation to FIG. 3, etc. The computer program may include one or more small executable program such as a Flash (Trade mark) program. A part of the program may be stored in a processor as above, but also in a ROM, RAM, PROM, EPROM or EEPROM chip or similar memory means. The programs may in part or in whole also be stored locally (or centrally) on, or in, other suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media such removable flash memories, USB-port flash drive memories, hard drives etc. may also be used. The program may also in part be supplied from a data network, including a public network such as the Internet. The computer programs described may also be arranged in part as a distributed application capable of running on several different computers or computer systems at more or less the same time.

It should be noted that while the above describes exemplifying embodiments of the invention, there are several variations and modifications which may be made to the disclosed solution without departing from the scope of the present invention as defined in the appended claims.

The invention claimed is:

1. A method for providing a user interface for an industrial control system wherein visual information presented at least in part displayed in layers arranged on a display screens of a control system, in which said control system a plurality of at least one of process graphics and other presentation schemes or devices provide information held by said control system, the method comprising:
   detecting a current process, system state and current user; and
   selectively displaying one or more layers providing an interface to a state or function of the current process, wherein a content of the one or more layers is determined based on said information available from said control system and by calculating which of the available layers comprising items of said visual information shall be selectively visually displayed or presented prominently, or displayed less prominently, or hidden, wherein determining which of the content of the one or more layers to be displayed is related to an application of the system or a task that is to be performed, a state of the system, user preferences, wherein when determining which of the one or more layers is to be displayed is related to a state of the system information most relevant to the state of the system is displayed first.

2. The method according to claim 1, further comprising:
automatically loading representations of one or more items of said information dependent on a status of a process controlled by said control system, the status comprising and not limited to any from the group of: start, run, process change, event, alarm, stop, offline, configuration or maintenance, simulation.

3. The method according to claim 2, further comprising:
automatically loading representations of one or more items of said information dependent on a task for an operator, the task comprising and not limited to any from the group of: start up, operate, change operation, alarm handling tasks, specific process related tasks, maintenance, shut down.

4. The method according to claim 3, further comprising:
automatically loading representations of one or more items of said information, and
displaying a first layer when loaded completely and before one or more other said layers have loaded.

5. The method according to claim 4, further comprising:
automatically loading representations of one or more items of said information, and
displaying or presenting each layer when completely loaded according to a load order for a plurality of the one or more said layers.

6. The method according to claim 1, further comprising:
automatically loading representations of one or more items of said information dependent on attributes of a user profile such as job description, authority, shared authorities, location, user preferences.

7. The method according to claim 1, further comprising:
automatically loading representations of one or more items of said information dependent on any of a process status, task for a process, user profile.

8. The method according to claim 1, further comprising:
generating a presentation scheme based on one or more representations or presentations of one or more items of said information comprising any from the group of: real time numerical value, real time graphical value, real time text values, static text, dynamic text, static mimic, dynamic mimic, sound signal, alarm sound, static visual effect, dynamic visual effect, haptic effect, any combination of visual, sound, haptic.

9. The method according to claim 1, further comprising:
automatically loading representations of one or more items of said information dependent on a load order for any of said one or more layers.

10. The method according to claim 9, wherein the load order for a said one or more layers is determined so as to reduce the loading time required before each of a series of the one or more said layers may be viewed at least in part.

11. The method according to claim 9, wherein the load order for a said one or more layers is determined in a priority dependent on importance of one or more representations of one or more items of said information.

12. The method according to claim 11, wherein the load order for a said one or more layers is determined in a priority dependent on which of one or more representations of one or more items of said information shall be displayed or presented most prominently.

13. The method according to claim 12, wherein the load order for a said one or more layers is determined in a priority dependent on which of one or more representations of one or more items of said information shall be displayed or presented at least one of less prominently or in the background.

14. The method according to claim 13, wherein the load order for a said one or more layers is determined in a priority including one or more representations of one or more items of said information that may be omitted from the load.

15. The method according to claim 9, wherein the load order for a said one or more layers is determined in a priority dependent on a user preference or a user profile.

16. The method according to claim 15, wherein at least one of the load order or content for a said one or more layers is determined in a priority dependent a role of a current user and the user profile.

17. The method according to claim 15, wherein at least one of the role of a current user or the user profile may comprise, and is not limited to, any from the group of: process operator or other person with responsibility for a part of the process, field operator, process supervisor, maintenance person, remote expert, local expert, person with responsibility for other staff, person with responsibilities during an emergency or rescue situation.

18. The method according to claim 1, wherein the selection of which of the layers shall be presented or visually displayed prominently, or displayed less prominently, or hidden may be changed manually by a user.

19. The method according to claim 1, wherein a selection of which of the layers shall be optimized to load or present or show representations of one or more items of said information first for recognition effect for operator during navigation/search for specific process information.

20. The method according to claim 1, wherein a selection may be manually changed by a user utilizing any computer input means device, or other data input element.

21. The method according to claim 20, wherein the selection may be manually changed by a user of utilizing at least one of any GUI computer input, a touch screen, a visual input element, a sound input element, or a gesture input.

22. The method according to claim 1, wherein a selection may be manually changed such that different representations the same of one or more items of said information may be presented at the same time.

23. The method according to claim 1, wherein a selection may be manually changed or configured to be persistent across sessions, persistent for single user, user group or all users, for the single display or for all displays, for the single work station or system wide.

24. The method according to claim 23, wherein a persistency of a manually changed selection may be varied by the user who specified the change.

25. The method according to claim 24, wherein the persistency of a manually changed selection may be configured so that other users may also access a layer with a manually changed selection.

26. The method according to claim 1, wherein representations of one or more items of said information for a process are grouped in one or more of a plurality of layers by configuring representations of control objects of said control system for inclusion in or exclusion from one or more layers according to a rule based system for optimizing display or other presentation element.

27. The method according to claim 26, wherein the representations of one or more items of said information for a process are grouped in one or more of plurality of layers by configuring representations of information objects of said control system for inclusion in or exclusion from one or more layers according to a rule based system for optimizing display.

28. The method according to claim 1, comprising providing and presenting information in a control system of an oil or gas storage, treatment or process installation.

29. The method according to claim 1, comprising providing and presenting information in a control system of an electrical generation, transmission or distribution installation.

30. A computer program product, comprising:
a non-transitory computer readable medium; and
at least one of computer code or software code portions recorded on the computer readable medium for making a computer or processor perform a method comprising detecting a current process, system state and current user, and selectively displaying one or more layers providing an interface to a state or function of the current process, wherein a content of the one or more layers determined based on information available from a control system and by calculating which layer comprising items of visual information shall be selectively visually displayed or presented prominently, or displayed less prominently, or hidden, wherein determining which of the content of the one or more layers to be displayed is related to an application of the system or a task that is to be performed, a state of the system, user preferences, wherein when determining which of the one or more layers is to be displayed is related to a state of the system information most relevant to the state of the system is displayed first.

* * * * *